United States Patent [19]

Steffe

[11] Patent Number: 4,564,178

[45] Date of Patent: Jan. 14, 1986

[54] LOG HOLDER

[76] Inventor: Harlan E. Steffe, Rural Rte., Moville, Iowa 51039

[21] Appl. No.: 624,124

[22] Filed: Jun. 25, 1984

[51] Int. Cl.$^4$ .............................................. B23Q 3/00

[52] U.S. Cl. ...................................... 269/17; 269/133; 269/296

[58] Field of Search ......... 269/238, 133, 196, 254 CS, 269/17, 207, 208, 69, 70, 282, 283, 257, 296; 182/153-154, 130-132, 181-182, 224-225

[56] References Cited

U.S. PATENT DOCUMENTS

| | | | |
|---|---|---|---|
| 308,356 | 11/1884 | Goodrich | 269/238 |
| 637,978 | 11/1899 | Valliere | 269/238 |
| 1,682,671 | 8/1928 | Gooding | 269/296 |
| 2,515,533 | 7/1950 | Suter | 269/283 |
| 2,896,513 | 7/1959 | Thomas et al. | 269/17 |

*Primary Examiner*—Robert C. Watson
*Attorney, Agent, or Firm*—Lucas J. De Koster

[57] ABSTRACT

A support to hold a log while sawing the log into fireplace lengths including a mechanism operated by the foot of the user to grasp the log and hold it clamped in place and having wheels so that the device will clamp easily and is easily moved from one place to another.

8 Claims, 3 Drawing Figures

LOG HOLDER

BACKGROUND AND SUMMMRY OF THE INVENTION

This invention pertains to devices similar to a sawhorse devised to hold a log in position for sawing it into fireplace or wood burning lengths, and more particularly to a readily portable device having mechanism for holding the log securely while it is being sawed.

The current high prices of many fuels used for heating dwellings has sparked a renewed interest in the use of wood as a fuel. Fireplaces and wood burning space heaters are now widely used as auxiliary heaters in many dwellings or, in some cases, as the principal heating unit in some dwellings.

As a result of the popularity of wood as a fuel, there is increased interest in the preparation of the fuel by the individual who will burn it. Chain saws for cutting down limbs or trees, log splitters, etc. have also become popular tools with people who are using wood as fuel.

However, there has been little improvement in the way logs are held for cutting to length. The old fashioned sawhorse, in which the log is cradled in a V-shaped notch formed by the upper legs of the device is still the usual piece of equipment used for this purpose.

By my invention, I provide a device which, by reason of having wheels, is readily portable. Further, I can clamp the log securely in place regardless of size, and at a relatively uniform height. The clamping action is accentuated by the force of the weight of the log and because of the wheels. The clamping is readily released for movement of the log after each cut is desired. Operation of the device is principally by foot so that the operator's hands are free to handle the log or the saw.

FIGURES

DESCRIPTION

Figure 1:
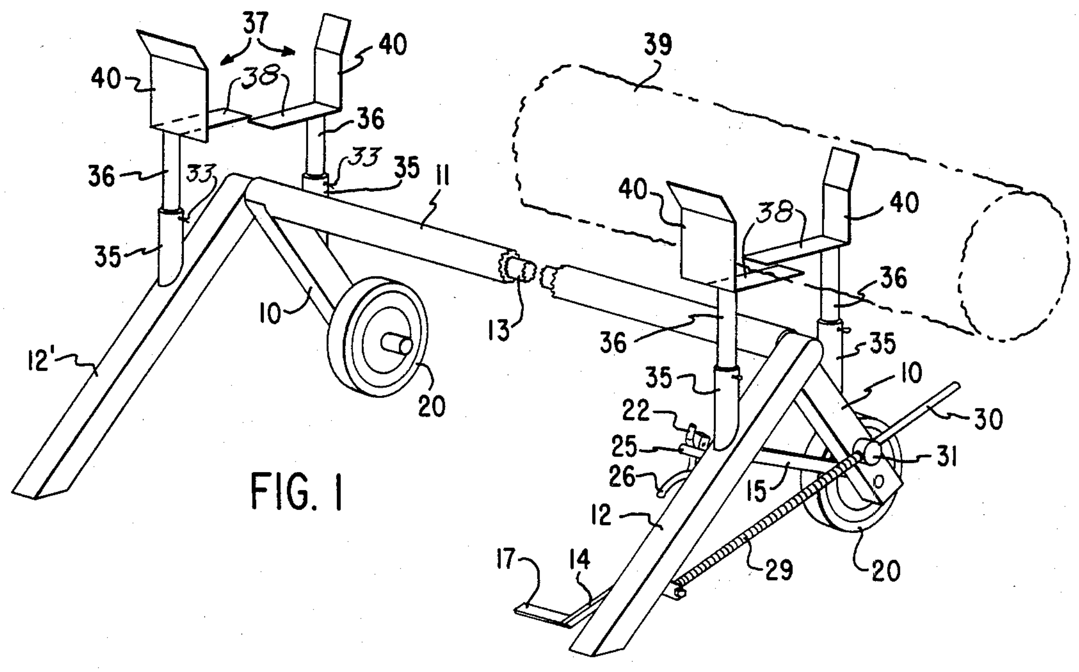
FIG. 1 is a pictorial view of the device showing a log lying in place.

Briefly my invention comprises a log holder similar to a sawhorse, but adapted to grasp and hold a log between clamping members, and to be readily portable.

More particularly and referring to the figures, I provide a framework composed of a pair of rear legs 10 joined together by a longitudinal pipe member 11, thus forming a single rigid piece. Front legs 12 and 12' are also joined together by a smaller pipe 13. This smaller pipe 13 is journalled inside the larger pipe 11 so that the legs 10 as a unit and 12 or 12' as a second unit can collapse on each other.

Figure 2:
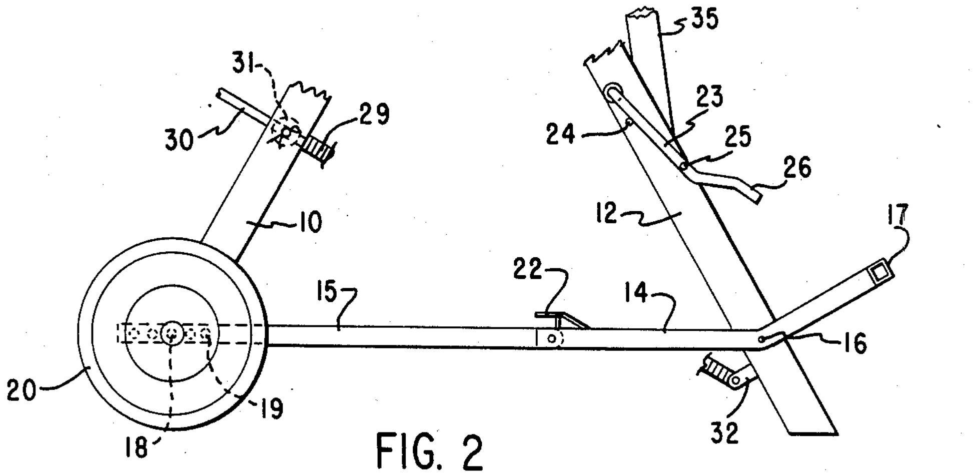
FIG. 2 is a detailed end view of the mechanism in the position in which the clamping portion is in a closed position.
Figure 3:
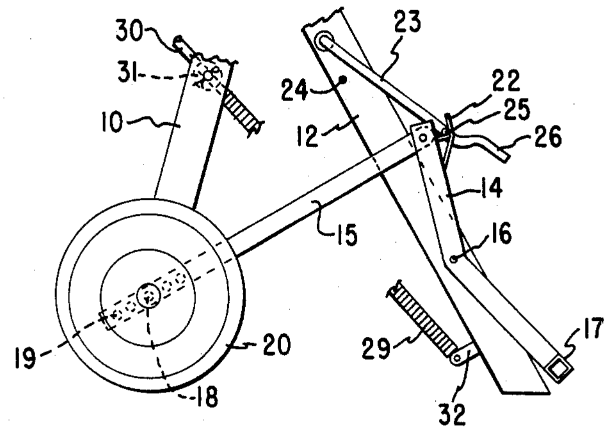
FIG. 3 is a view similar to FIG. 2 showing the mechanism in an open position.

The position of the legs relative to each other is principally controlled by a linkage attached near the bottom of the legs as best shown in FIGS. 2 and 3. This linkage is composed of a crank member 14 and a link 15. The crank member 14 is pivotally connected to the leg 12 at a pivot point 16 and is operated through a pedal 17. At the end opposite the pedal, the crank 14 is pivotally connected to the link 15. The end of the link 15 opposite that connection is pivoted at 18 to one of the legs 10. Adjustment of the spread between the legs 10 and 12 in the closed position may be provided by forming a series of holes 19 in the links 15 which may be alternately attached at the pivot 18, thus providing alternate lengths for the links 15 when the legs are fully spread.

In order to provide ready portability of the device and to facilitate the clamping, I preferably mount wheels 20 on axles at the pivot 18. These wheels allow the device to be tipped so that it can be easily rolled over the ground to a different location, and they also provide for a ready spreading of the legs which tends to move them to the closed position. When the device is in the position shown in FIG. 2, the operator can step on the pedal 17. Such action will tend to pull the legs 10 and 12 together, and the pipes 11 and 13 will transmit that motion to the pair of legs 10 and 12' at the other end of the device. By having the wheels 20 rolling freely on the ground, the closing between the legs is accomplished with only a modest amount of force required. Furthermore, it will be apparent that added weight on the device will tend to cause the legs to spread apart, thus clamping the log tighter as will later appear.

To latch the device in the open position shown in FIG. 3, I provide a bracket 22 forming a saddle with the crank 14. A latch member 23 is pivoted to the leg 12 above the end of the crank 14 when raised so that it tends to drop under the force of gravity. A stop 24 holds the latch in position. A peg 25 on the latch 23 extends outwardly in position to be engaged by the bracket 22 when the crank is raised, and eventually is displaced and will drop into the saddle to latch the crank 19 in its closed position (See FIG. 3). To release the latch, the operator can grasp the end 26, which may be bent as shown, and can pull the latch so that it comes out of the saddle and releases the crank to fall to the unlatched position.

In order to tend to keep the device in its closed position, I use a compression spring device. In essence, the spring 29 is coiled around a rod 30. The rod is pivotally fastened to the leg 12 and is slidable through a knob 31 pivoted on leg 10. The spring, then, is engaged between the knob 31 and the attaching bracket 32 on the leg 12 and tends to press the legs apart thereby squeezing the log. As noted above, this action is augmented by the weight of the device and the log tending to spread the legs.

Each of the four legs carries a pipe-like socket member 35 (FIG. 1). The sockets in these members are adapted to receive a post 36 attached to an L-shaped log holding bracket 37. The posts may be pinned into the brackets 37 by pins 33 to prevent turning in the socket or inadvertent removal.

Each of the brackets 37 has a horizontal leg 38 on which a log 39 may rest, and a vertical leg 40 which will be tightened against the log. As shown, these horizontal legs are offset so that they will bypass each other in the closed position. I envision that the brackets may be made in different sizes in order to accommodate various sizes of logs. It is obvious that they are easily replaceable in the socket members 35. The upper parts of the vertical bracket leg 40 may be flared outwardly for convenience in placing the log into the device.

In use, the device is rolled to the desired location and is opened to the position illustrated in FIG. 2. A log is placed on the horizontal bracket legs 38, after the operator steps down on the pedal 17. This stepping causes the legs 10 to be pulled toward the legs 12 and 12' until the latch mechanism is engaged, thus tilting the clamping brackets 37 and causing them to separate. Releasing the mechanism after the log is in place allows the spring 29 to force the legs apart, augmented by the force of the weight tending to spread the legs. This motion causes the brackets 37 to be tilted toward each other, thus clamping the log between the vertical legs 40.

In the closed or clamped position, it is possible to saw either a portion of the log beyond the clamping bracket or even between the brackets. In the latter case, because the clamping action will tend to hold the parts of the log in position without sagging, there will be considerably less binding on the saw as it cuts through the log.

I claim as my invention:

1. Log supporting device comprising a back group of legs fixedly joined together, a front group of legs fixedly joined together, said front group being pivotally joined to said back group, each leg of said front group being opposed by a corresponding leg of said back group to form a set, each set thereby comprising one back leg and one front leg, said front legs being pivotally tiltable relative to said back legs, log support means on at least two of said sets of legs, said support means being thereby tilted toward each other as said legs are pivotally separated.

2. The device of claim 1 in which said support means include post means fixed to said legs and removable bracket means removably engaged with said post means.

3. The device of claim 2 in which said bracket means are each L-shaped having one leg substantially horizontal to support a log and one leg substantially vertical to engage the side of the log and, with the cooperation of the opposite bracket, to clamp the log in position.

4. The device of claim 1 in which linkage means is engaged between at least one set of opposite legs whereby the space between the legs of that set and all similar sets can be varied.

5. The device of claim 4 in which said linkage includes a pedal means so that said linkage can be operated by a user's foot.

6. The device of claim 4 in which said linkage has a closed position in which said set of legs is separated and an open position which said legs are brought together, and latch means is releasably engagable with said linkage means to hold said device releasably in an open position.

7. The device of claim 6 in which spring means is engaged between at least one set of legs to urge said legs to the closed position.

8. The device of claim 4 in which each set of legs includes one front leg and one rear leg, wheels journalled on each of said rear legs whereby the device is readily portable and whereby the weight on the legs tends to spread the legs to the closed position of the bracket means.

* * * * *